3,113,150
PREPARATION OF N-ACETYL-p-AMINOPHENOL
David W. Young, Homewood, Ill., assignor to Sinclair Research, Inc., Wilmington, Del., a corporation of Delaware
No Drawing. Filed Oct. 6, 1961, Ser. No. 143,283
6 Claims. (Cl. 260—562)

This invention relates to a novel method of producing a substantially pure N-acetyl-para-aminophenol.

In the past few years a new class of non-volatile antioxidants for petroleum products, greases, synthetic lubricants, plastic rubbers, resins, etc. have been developed. The materials may be called acylated p-aminophenols as a class. Of this class the lower molecular weight members, particularly N-acetyl-p-aminophenol, have found extensive use in the pharmaceutical industry as analgesic additives in aspirin and the like.

One of the major problems with the preparation of N-acetyl-p-aminophenol has been the high purity specifications the product must meet in order to be acceptable for use in pharmaceutical compositions. One pharmaceutical company, for example, has listed the following specifications as N-acetyl-p-aminophenol product must meet to be acceptable:

(1) Description: White, powder crystalline
(2) APHA: 15 maximum
(3) Solubility: Methanol—clear; hot water—clear
(4) Melting range: 169–171° C.
(5) pH: 5.5 to 6.5
(6) Residue on ignition: 0.5% maximum
(7) Moisture: 0.5% maximum
(8) Assay: 98% minimum (U.V.)
(9) Chlorides: 300 p.p.m. maximum
(10) Sulfates: 400 p.p.m. maximum
(11) Heavy metals: 30 p.p.m. maximum
(12) Odor: None One of the most common failures in manufacture has been the inability to meet the requirement as to color, i.e. an APHA of 15 maximum.

N-acetyl-p-aminophenol is generally prepared by a condensation reaction which comprises heating p-aminophenol and acetic acid in the presence of an entraining solvent such as benzene, toluene, xylene and the like. The product is then dehydrated by evaporation. This general method fails to produce a white pharmaceutical grade product. Accordingly, various methods of recrystallization, distillation and solvent extraction have been attempted with varying degrees of success. In all cases to produce a pharmaceutical grade N-acetyl-p-aminophenol it has been found essential that the p-aminophenol starting material be of high grade, i.e. substantially pure and white, indicating essentially unoxidized and uncolored p-aminophenol. Moreover, even if the p-aminophenol starting material is of this high grade, to produce a white pharmaceutical grade N-acetyl-p-aminophenol, it has heretofore been necessary to conduct the condensation of p-aminophenol and acetic acid under a gas such as sulfur dioxide and in the presence of a catalyst such as boric acid. The disadvantages of this latter method are obvious. In addition to being a costly operation that necessitates the use of a catalyst, it is time-consuming and laborious. The reaction proceeds slowly and large amounts of water are formed that must be removed during the reaction. Entraining solvents such as xylene, toluene, etc. are commonly employed to assist in this removal, which solvents must be removed at the completion of the reaction. The removal of these solvents, of course, entails yet another operation, ordinarily that of distillation. To add further complication, one is confronted with the cumbersome task of maintaining a blanket of gas over the reactants.

I have discovered a relatively simple method of producing a relatively pure N-acetyl-p-aminophenol at a surprisingly rapid rate without the need of a catalyst, a blanket of inert gas nor a substantially pure, white p-aminophenol starting material. In accordance with my invention, I mix p-aminophenol with water in a ratio of at least about 1 part by weight $H_2O$ per 2 parts of p-aminophenol and with acetic anhydride. Advantageously, the p-aminophenol and water are first mixed with the acetic anhydride being added subsequently; however, other mixing procedures can be used providing the acetic compound is essentially in the anhydride form when brought together with both the p-aminophenol and water. The resulting mixture is then agitated at a temperature of up to about 130° C., preferably up to about 70° C. or 85° C., and usually no advantage is associated with using less than ambient temperature. The reaction of the p-aminophenol is surprisingly rapid, starting almost instantaneously on mixing with water and acetic anhydride and is substantially over in a few minutes, e.g. about 3 to 20 to 60 or more minutes. On completion of the reaction, the N-acetyl-p-aminophenol product is treated with aqueous ammonium hydroxide sufficient to provide a mixture having a pH of at least about 6, preferably about 6.5 to 9. The product can then be separated by cooling to crystallization temperature. In a more preferred method, on completion of the reaction, the mixture is cooled, usually to a temperature below about 30° C., preferably to about 10 to 20° C., to precipitate N-acetyl - p - aminophenol. The precipitated N-acetyl-p-aminophenol is separated as by filtration and the separated product is then dissolved in an aqueous solution of ammonium hydroxide to give the pH described above and the ammonium-treated product is separated by cooling to crystallizing temperatures.

The method of the present invention produces a relatively pure, white product or at worst an intermediate which can be readily made white by contact with a solid adsorbent. Thus, alternately, the ammonium hydroxide-treated product either before separation by crystallization or after crystallization and dissolving in water can be contacted with a solid adsorbent, for instance an inorganic material such as carbon black, preferably iron-free, at a temperature of up to about 100° C. or somewhat more. The amount of adsorbent employed usually falls in the range of about 3 to 10 weight percent or more (based on the total solution). A contact time of equal to or greater than about 5 minutes is generally employed. The mixture is then filtered free of the solid adsorbent and cooled to recrystallize or precipitate N-acetyl-p-aminophenol. The N-acetyl-p-aminophenol is then separated from the ammonium hydroxide to obtain a substantially pure, white final product.

The amount of water employed in the reaction is that which bears a weight ratio to p-aminophenol used of at least about 0.5:1, preferably at least about 0.9:1. Water to p-aminophenol weight ratios may be as high as 20:1 or more but use of excessive amounts of water can be disadvantageous in that it may reduce the yield of the desired product. Most advantageous results are obtained when the water to p-aminophenol weight ratio is in the range of about 1:1 to 5:1. The mole ratio of acetic anhydride to p-aminophenol in the present invention is a matter of economics. It is preferred to employ equal to or greater than stoichiometric amounts of acetic anhydride (acetic acid basis) based on the p-aminophenol. Generally, the molar ratio of the acetic anhydride (acetic acid basis) to p-aminophenol is equal to or greater than about 1.

Thus, it should be appreciated that the present invention obviates the aforementioned disadvantages of presently known methods for the manufacture of N-acetyl-p-aminophenol by providing a simpler method that produces a substantially pure, white product in far less time, without the assistance of catalysts or blanketing gases and does not need a high-grade, i.e. a substantially pure, white p-aminophenol starting material although such may be used if desired. In other words, the starting material can be of a light color.

The following examples are included to further illustrate this invention.

EXAMPLE I

One mole of substantially pure, white p-aminophenol was agitated with 25 grams of distilled water to make a paste. To this mixture, held in a beaker, was added 1.1 moles of acetic anhydride (iron-free). The mixture was agitated by hand at room temperature and the temperature went first to 50° C. and then to 70° C. at a rapid rate. In 5 minutes the reaction was over. While hot, the product was about one-third soluble in a liquid phase. Upon cooling at a temperature of 15° C. the product came quickly out of solution. Excess acetic acid made in the run was removed by filtration through a glass filter and the product was then diluted with ammonium hydroxide to neutralize any remaining acetic acid. The resulting solution had a pH of 6.5. To the solution was added 10 grams of Norit carbon black (iron-free) and the mixture was agitated at about 80° C. for 5 minutes. The mixture was filtered through paper to remove the carbon black. The filtrate was then cooled and the product came out of solution as a white crystalline material with very good physical properties. The product was separated from the solution and dried. The yield of product was 94% by weight.

The product of this example was tested and found to meet the aforementioned specifications set forth by one pharmaceutical company. In fact, the product of Example I met the following more stringent specifications:

(1) Description: White, powder crystalline
(2) APHA: 15 maximum
(3) Solubility: Methanol: clear. Hot water: clear
(4) Melting range: 170–171° C.
(5) pH: 6.0 to 6.5.
(6) Residue on ignition: None
(7) Moisture: 0.25% maximum
(8) Assay: 99% minimum (U.V.)
(9) Chlorides: 100 p.p.m. maximum
(10) Sulfates: 200 p.p.m. maximum
(11) Heavy metals: 20 p.p.m. maximum
(12) Odor: None The tests employed to determine whether the above specifications were met are as follows:

APHA: Weigh 3 grams of APAP [1] on laboratory balance and transfer to a stoppered 100 ml. graduated cylinder. Add methanol to the 25 ml. mark and shake until APAP is dissolved. Then add distilled water to the 100 ml. mark and mix well. Transfer to Lumetron Nessier tube and fill to 150 mm. mark and take density (X10) reading using B-420 blue filter and distilled water at 150 mm. for a blank.

Determine correct APHA from graph.

The APHA method of determining color was established by the American Public Health Association. For this test, we are using a Photo-volt Lumetron No. 450 which obviates error caused by the human eye.

Solution—methanol: One gram dissolves in 20 ml. of methanol to give a clear solution. Hot water: One gram dissolves in 20 ml. of hot water to give a clear solution.

Melting range: See USP XV, p. 929, Class I.

pH: Shake a one gram sample of APAP with 25 ml. of distilled water for two or three minutes and take a pH

[1] N-acetyl-p-aminophenol.

of this saturated solution with a suitable pH meter using a glass and calomel electrode.

Residue on ignition: Accurately weigh about one gram of APAP into a tared crucible and ignite until thoroughly charred. Cool and add about 2 ml. of sulfuric acid and cautiously ignite until the fuming is finished and most of the carbon is consumed. Then transfer to a muffle furnace and heat at 800° for one hour. Cool and weigh.

Moisture: Karl Fischer method; USP XV, p. 942.

Assay: Weigh accurately 0.1 gm. to 0.15 gm.±0.0002 of APAP and transfer quantitatively to a 100 ml. volumetric flask. Add by pipette 25 ml. of methanol and dissolve the APAP. Dilute to the mark with water. Pipette 1 ml. of the solution into another 100 ml. volumetric flask and add 1 ml. 0.1 N HCl, then dilute to the mark with methanol. Read the final solution on Beckman Du Spectrophotometer at 249 m$\mu$ using methanol which contains 1.0 ml., 0.1 N HCl for each 100 ml. as a blank.

$E_{1cm}^{1\%}$ at 249 m$\mu$ for APAP=875

Calculation: (Method is accurate to ±2%)

$$\frac{\text{Optical density at } 249 \times 100}{\text{Wt. of sample in gms.}} \times \frac{1}{875} \times 100 = \text{percent APAP}$$

Chlorides: Shake one gram of APAP in 25 ml. of distilled water. Filter and acidify filtrate with 1 ml. of dil. nitric acid. No more turbidity is shown than that produced by a blank which contains 3 ml. (300 p.p.m.) of standard chloride solution. USP XV, p. 948, when both sample and blank have 2 ml. of .1 N AgNO$_3$ added.

Sulfates: Shake one gram of APAP with 25 ml. of distilled water and filter. Acidify filtrate with 2 ml. of dil. acetic acid. Add 2 ml. of barium chloride T.S. After 10 minutes no more turbidity is produced than that of a blank which contains distilled water, 2 ml. of dil. acetic acid and 4 ml. (400 p.p.m.) of standard sulfate solution USP XV, p. 950.

Heavy metals: Shake one gram of APAP in 25 ml. of distilled water for about 3 minutes. Filter and acidfy the filtrate with 2 ml. of dilute acetic acid and add 10 ml. of water. No more color is produced after 10 minutes than a blank run at the same time which contains 3 ml. of standard lead solution (30 p.p.m.) USP XV, p. 898.

Odor: No odor should be present.

Moreover, the optical density of the product of Example I was determined and compared to the optical density of an N-acetyl-p-aminophenol product currently marketed for use in pharmaceutical compositions. The optical densities were found to be substantially identical.

EXAMPLE II 55 grams of p-aminophenol having a light but brownish color was placed in a 600 ml. Pyrex beaker with 40 g. of distilled water at room temperature. The mixture was agitated to make a paste. The temperature of the paste was found to be 82° C., 78 cc. of acetic anhydride (iron-free) were then added and the temperature rose to 120° C. In 12 minutes the reaction was over. The reaction mixture was then cooled to a temperature of 20° C. and the product precipitated quickly out of solution. The precipitated product was then separated from the reaction mixture by filtering and divided into Samples I through VI. The individual samples were processed as follows:

*Sample I.*—Ammonium hydroxide was added to provide a solution having a pH of 7. The solution was permitted to stand for about 1 hour after which 5 weight percent of iron-free carbon black (based on the total solution) was added and the mixture was agitated at about 80° C. After treatment with the carbon black for about 1 hour, the mixture was worked up as follows:

The mixture was filtered through a glass fritter filter to remove the carbon black and the filtrate placed under a clean air stream and hot lamp light to evaporate the solution and give crystals of N-acetyl-p-aminophenol.

The total volume of the solution was held to about 50 cc. by distilled wash water used to wash the glass beaker, glass filter and vacuum Pyrex flask. The N-acetyl-p-aminophenol crystals were removed on a paper filter and air-dried at 25° C.

The final product was white and had a melting point of 170° C. A check of carbon, hydrogen and nitrogen content showed the product to be very pure.

*Sample II.*—This sample was dissolved in water and worked up in the same manner as Sample I. No NH₄OH treat or carbon black treat was employed.

Analysis of the final product showed it to be an impure dark sample.

*Sample III.*—This sample was dissolved in water, carbon treated and worked up in the same manner as Samples I and II but no NH₄OH treat was employed.

Examination of the final product showed it to be an impure dark sample.

*Sample IV.*—This sample was processed in a manner identical to that employed on Sample I except that a period of 10 days elapsed before the NH₄OH treat, carbon black treat and work up.

Examination of the product showed it to be of a light grey color.

*Sample V.*—This sample was treated with NH₄OH as in Sample I but the sample was held at a pH of 7 for 10 days before it was worked up. No carbon black treat was employed.

Examination of the sample showed it to be of a slight grey color.

*Sample VI.*—This sample was permitted to stand for 10 days and treated with carbon black and worked up as in the above samples. No NH₄OH treat was employed.

The resulting product was of a grey color.

The results of the above samples demonstrate the importance of the ammonium hydroxide treat in obtaining N-acetyl-p-aminophenol of good color and purity. A comparison of the methods used in Samples I, II and III, for example, shows that only when the NH₄OH treat was included was a pure white product obtained. Samples IV, V and VI further emphasize the significance of the NH₄OH treat of the present invention in that undue delay in applying the NH₄OH treatment will produce a slightly colored final product. The NH₄OH contacting preferably should be within 24 hours, or even within 2 to 5 hours, of the completion of the preparation reaction and most advantageously immediately after completion of the reaction.

EXAMPLE III 109 grams of p-aminophenol were dissolved in 100 cc. of water to which was added 70 grams crystalline acetic acid. As soon as the dissolution was completed 123 grams of acetic anhydride were added and stirred in. The temperature of the reaction rose slightly and N-acetyl-p-aminophenol was precipitated by slow cooling and separated by filtration. The resulting product had a melting point of 167° to 169° C. The product was then recrystallized from alcohol and water and the resulting product was found to have a melting point of 166 to 168° C. A second run was conducted and the N-acetyl-p-aminophenol crystalline product obtained had a melting point of 167 to 170° C. Upon recrystallization from alcohol and water this product was found to have a melting point of 167 to 169° C. All products produced by this process had a grey color.

EXAMPLE IV

This example is included to show the effect of water on the reaction of p-aminophenol with acetic anhydride.

10 grams of p-aminophenol having a light color were placed at room temperature in a 600 milliliter Pyrex beaker with amounts of distilled water designated in Table I below. The mixture was agitated to make a paste. The temperature of the paste was 25° C. 11 grams of acetic anhydride were then added and the temperature rose as indicated in Table I below. On completion of the reaction the mixture was cooled and the N-acetyl-p-aminophenol precipitated out of solution. The precipitated product was then separated from the reaction mixture by filtration. The resulting products were subjected to chemical analysis and the melting point of each was determined. The results are shown in Table I below.

Examination of the data of Table I shows that when the reaction is conducted in the absence of water diacyla-

*Table I*

| Run | 1 | 2 | 3 | 4 | 5 | 6 | 7 | 8 |
|---|---|---|---|---|---|---|---|---|
| p-Aminophenol...........g.. | 10 | 10 | 10 | 10 | 10 | 10 | 10 | 10 |
| H₂O.......................g.. | 150 | 100 | 60 | 35 | 20 | 0 | 5 | 9 |
| Acetic anhydride pure.....g.. | 11 | 11 | 11 | 11 | 11 | 11 | 11 | 11 |
| Time, acetic anhydride....a.m.. | 11:10 | 11:11 | 11:12 | 11:13 | 11:14 | 11:15 | | |
| Started at, ° C............ | 25 | 25 | 25 | 25 | 25 | 25 | 25 | 25 |
| Temp. up to, ° C.......... | 33 | 39 | 44 | 48 | 69 | 122 | 100 | 74 |
| M. Pt. of product.......... | 167–169 | 166–169 | 167–169 | 167–168 | 166–168 | *141–148 | **166–167 (7.85 N) | 166–168 (9.28 N) (9.17 N) |
| Color..................... | Poor | Poor | Poor | Poor | Poor | Poor | Poor | |

\* Infra-red analysis shows 50% of product is diacetyl ester.
\*\* Infra-red analysis shows about 1 to 2% of product is diacetyl ester.

tion occurs to the extent that approximately 50% of the product obtained is diacetyl ester. Employment of an amount of water that bears a weight ratio of p-aminophenol of .5:1 (run 7) to .9:1 (run 8) results in a product that contains only about 1 to 2% of diacetyl ester. Use of water in a weight ratio to p-aminophenol greater than .9:1 as in runs 1 to 6 results in a product containing no or infinitesimal amounts of the diacetyl ester. Furthermore, from the poor color of all the products obtained, the data again demonstrate the importance of the ammonium hydroxide treat of the method of the present invention.

This application is a continuation-in-part of application Serial No. 804,150, filed April 6, 1959, now abandoned.

I claim:

1. In a method of producing substantially pure N-acetyl-p-aminophenol having a melting point in the range of 169 to 171° C., the steps which comprise reacting at a temperature of up to about 130° C. p-aminophenol and acetic anhydride in water in a weight ratio to said p-aminophenol of at least about .5:1 to produce N-acetyl-p-aminophenol, adding to said N-acetyl-p-aminophenol sufficient aqueous ammonium hydroxide to bring the pH to at least about 6, cooling the mixture to crystallize N-acetyl-p-aminophenol, and recovering substantially pure N-acetyl-p-aminophenol.

2. The method of claim 1 wherein the weight ratio of water to p-aminophenol is at least about 0.9:1.

3. The method of claim 1 wherein after said ammonium hydroxide addition the product is contacted with a solid adsorbent.

4. The method of claim 3 in which the reaction is conducted at a temperature up to about 70° C.

5. The method of claim 3 wherein the solid adsorbent is iron-free carbon black.

6. In a method of producing substantially pure N-acetyl-p-aminophenol having a melting point in the range of 169 to 171° C., the steps which comprise reacting at a temperature of up to about 70° C. p-aminophenol and acetic anhydride in water in a weight ratio to said p-aminophenol of at least about 0.9:1 to produce N-acetyl-p-aminophenol, adding to said N-acetyl-p-aminophenol sufficient aqueous ammonium hydroxide to bring the pH to at least about 6, contacting the resulting mixture with iron-free carbon black, removing said carbon black and cooling the mixture to crystallize N-acetyl-p-aminophenol, and recovering substantially pure N-acetyl-p-aminophenol.

References Cited in the file of this patent

UNITED STATES PATENTS

| | | |
|---|---|---|
| 2,070,991 | Hand et al. | Feb. 16, 1937 |
| 2,721,213 | Mooradian | Oct. 18, 1955 |
| 2,901,508 | Korman | Aug. 25, 1959 |
| 2,998,450 | Wilbert et al. | Aug. 29, 1961 |

OTHER REFERENCES

Lumiere et al.: Bull. Soc. Chim, France, volume 33, 3rd series (1905), page 785.

Degering: An Outline of Organic Nitrogen Compounds, published by University Lithoprinters (Ypsilanti, Mich.), page 398 (1950).

Noller: Chemistry of Organic Compounds, published by W. B. Saunders Co. (Philadelphia), pages 238–239 (1951).